Sept. 9, 1969  W. S. LARSON ET AL  3,466,213
MANUFACTURE OF CONTINUOUS TUBULAR ARTICLE
Filed April 14, 1966  8 Sheets-Sheet 1
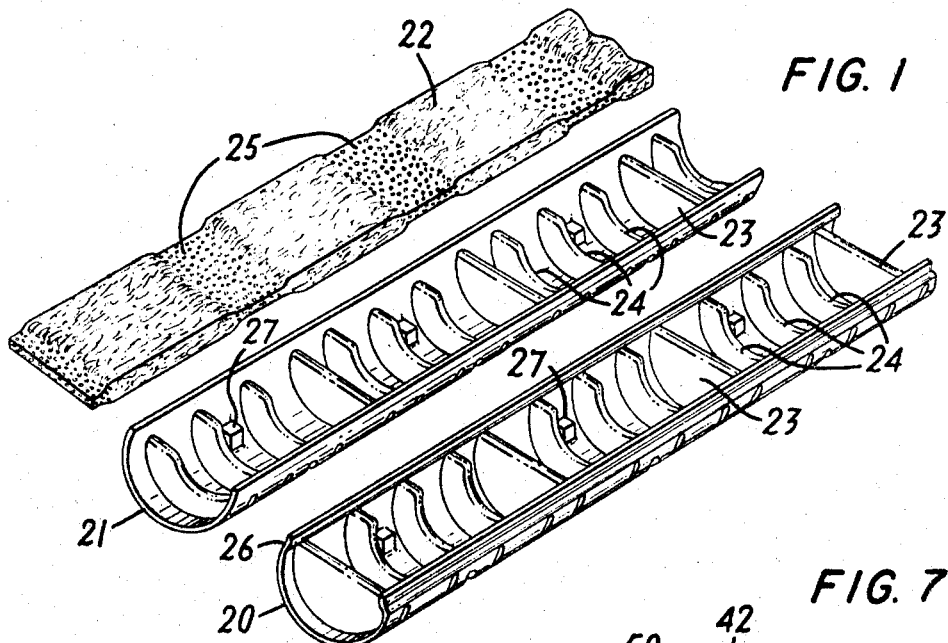
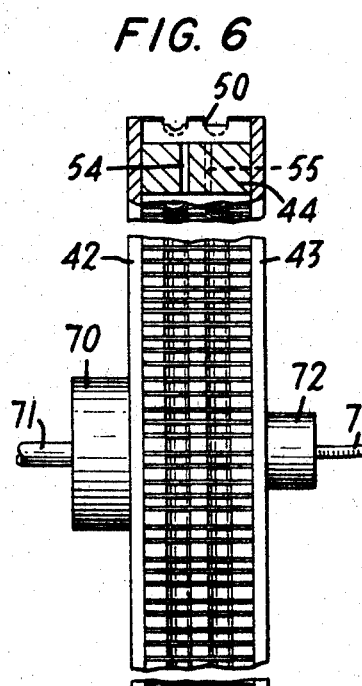
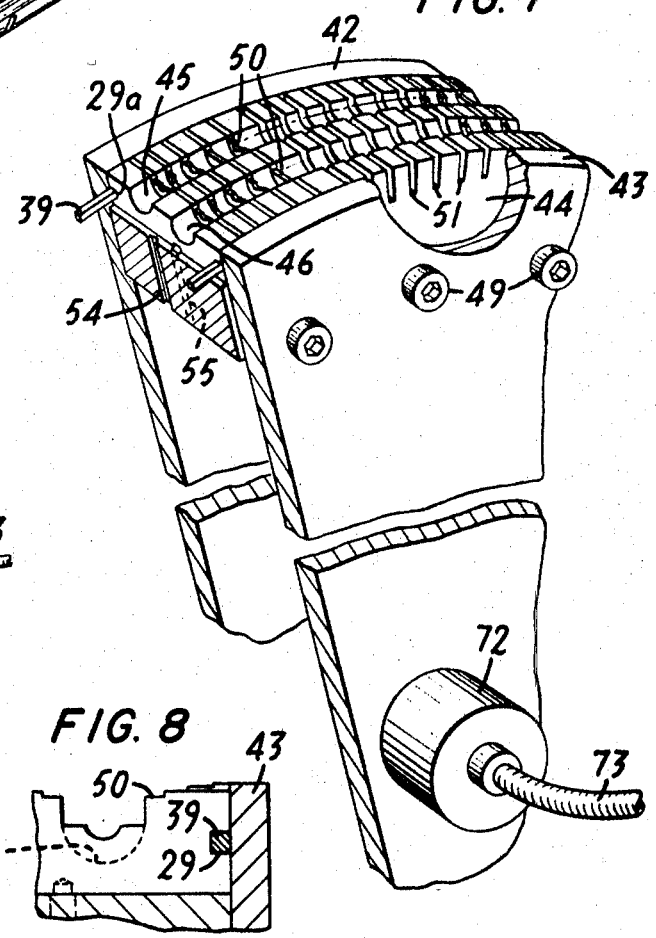

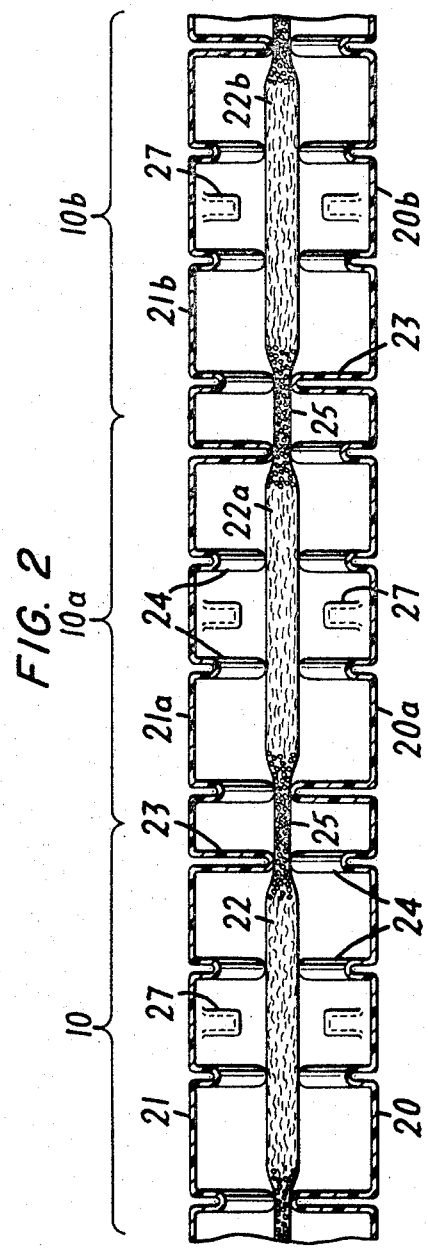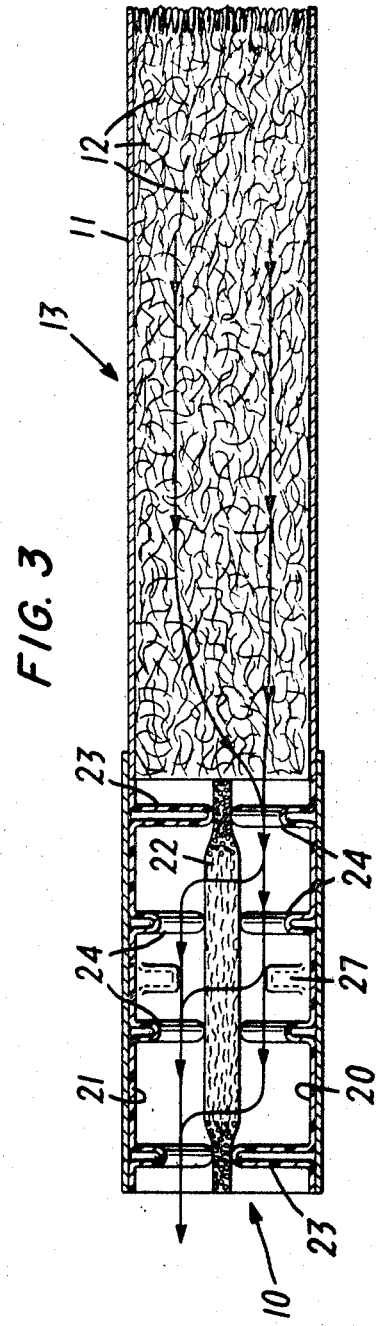

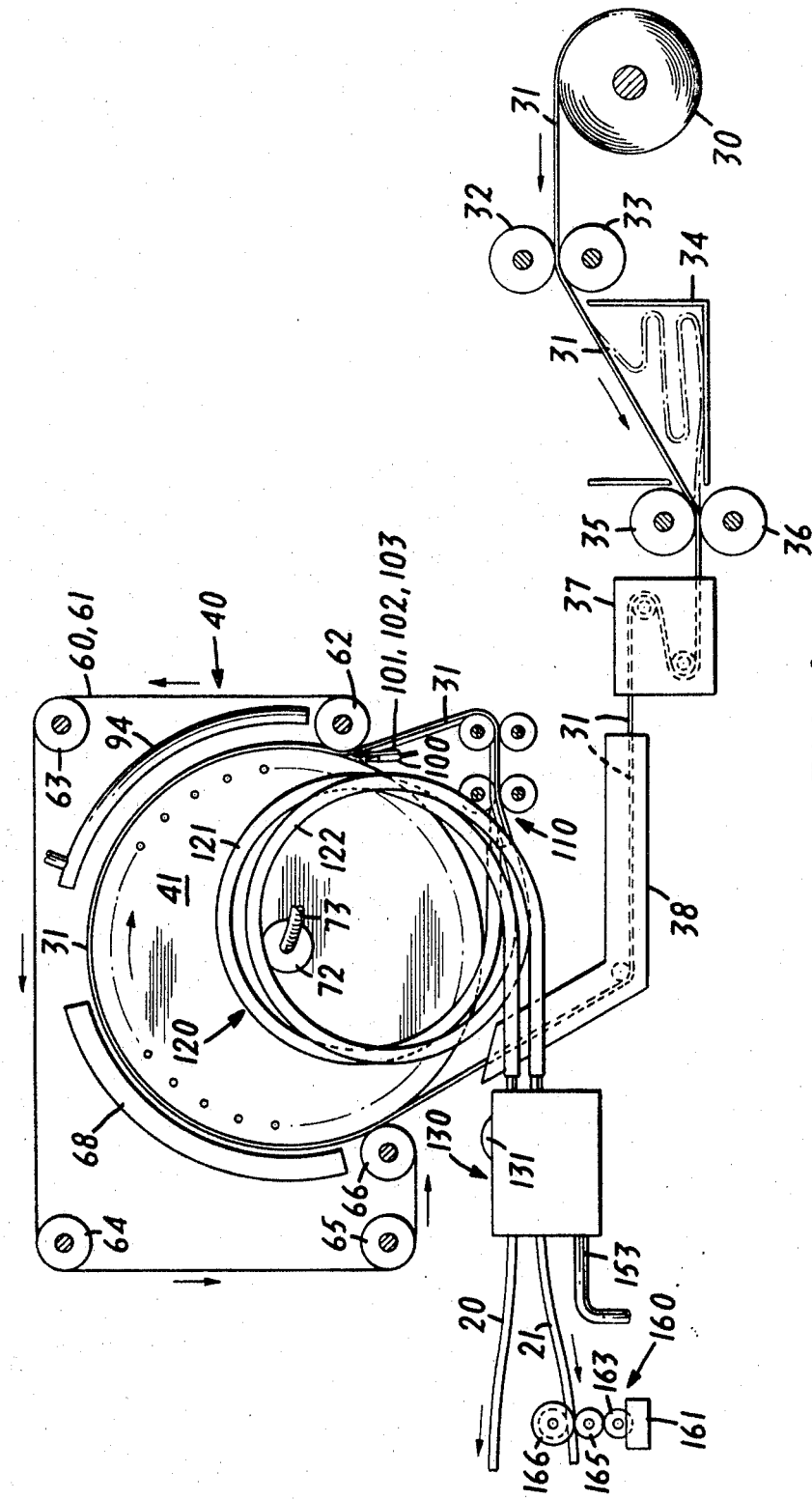

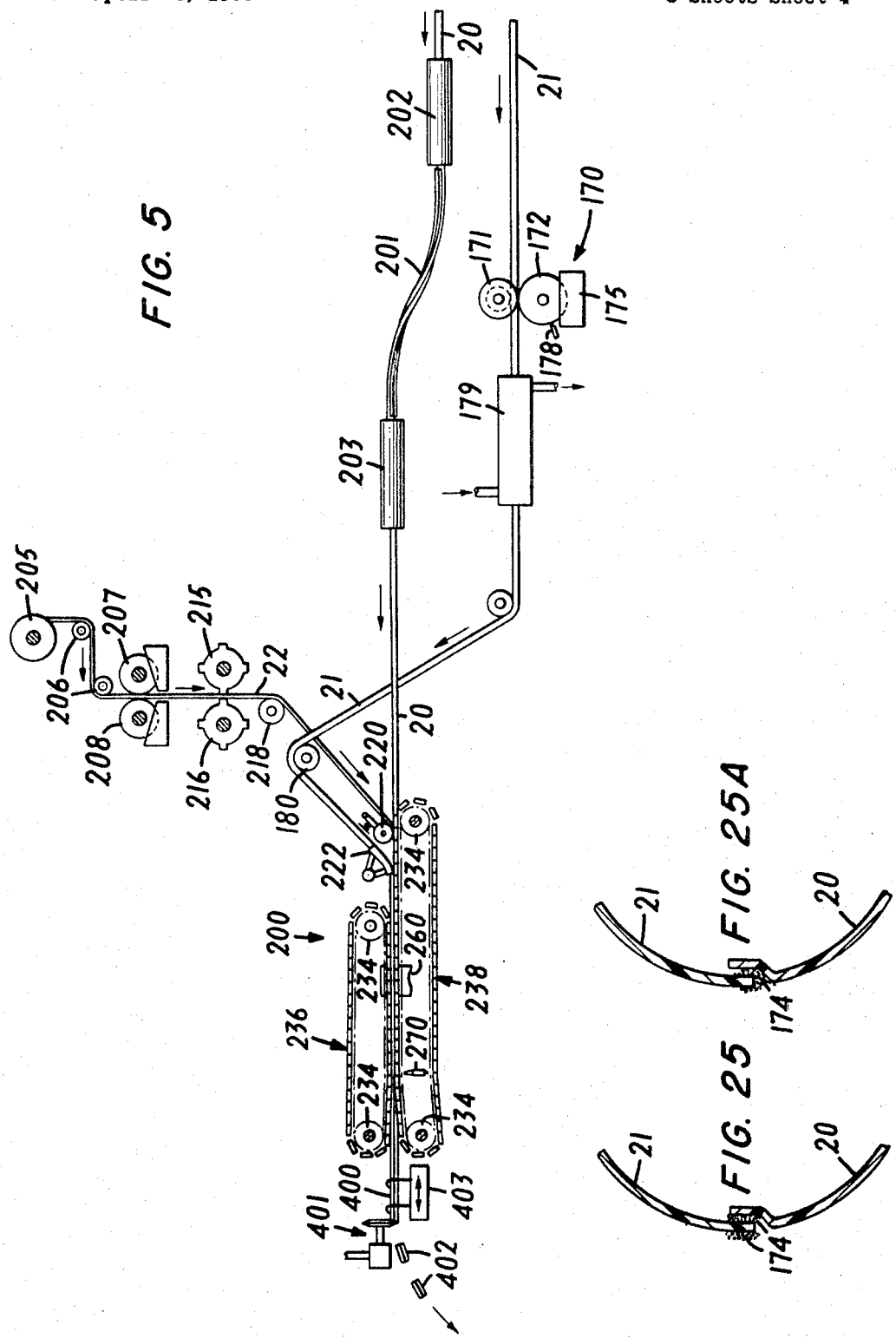

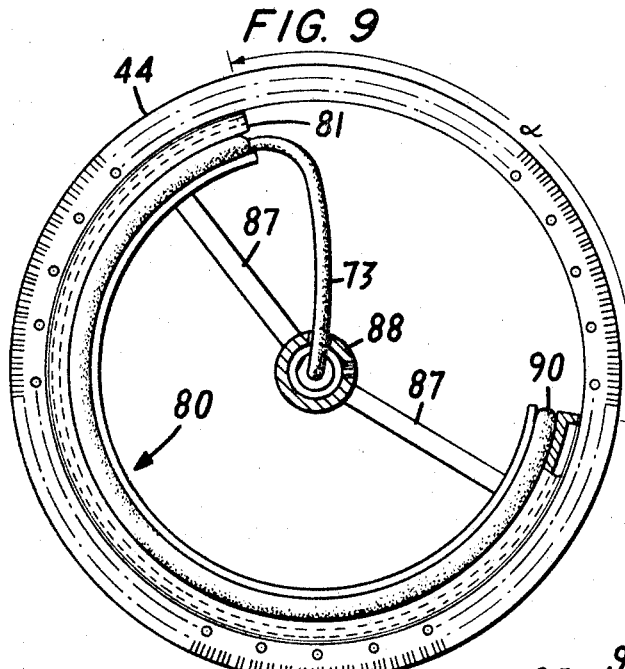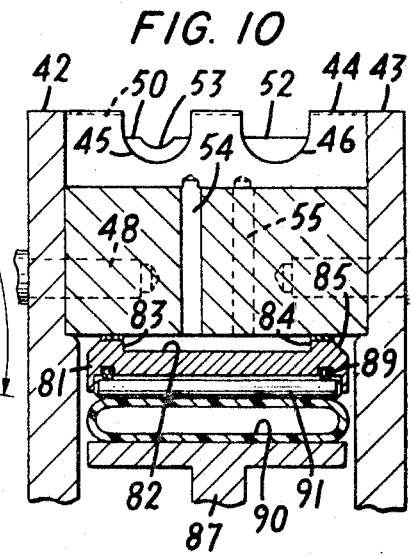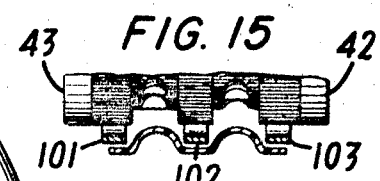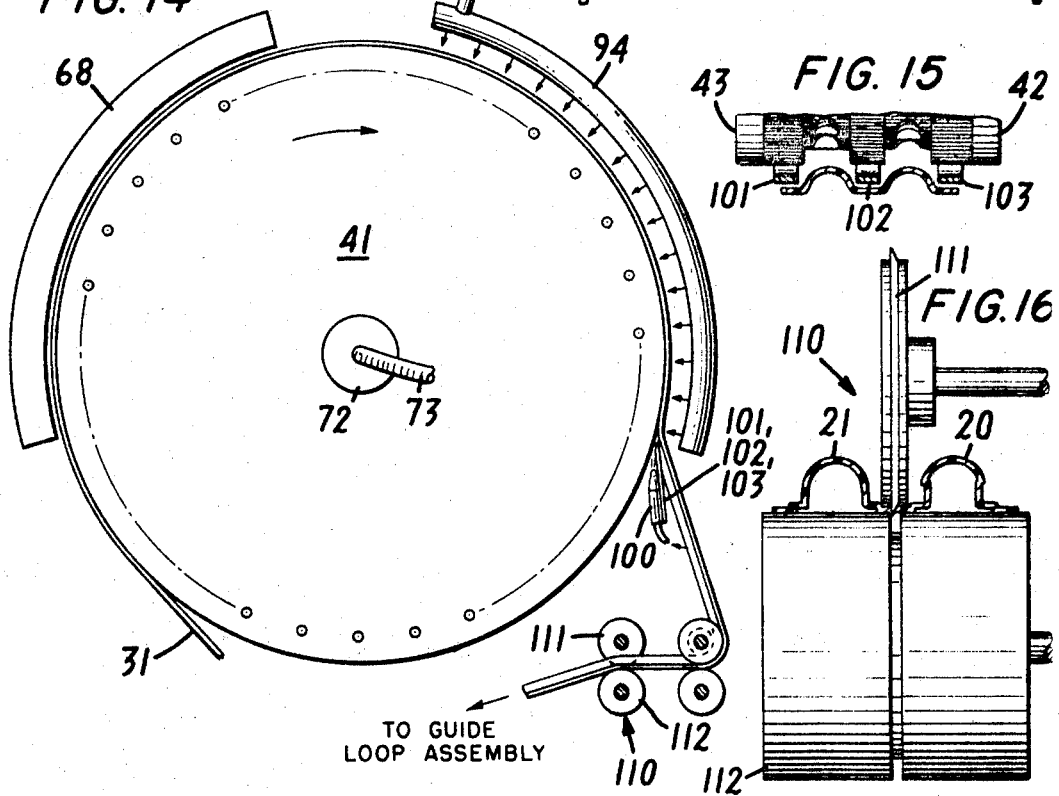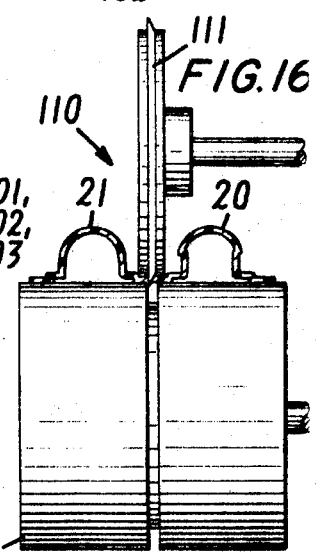

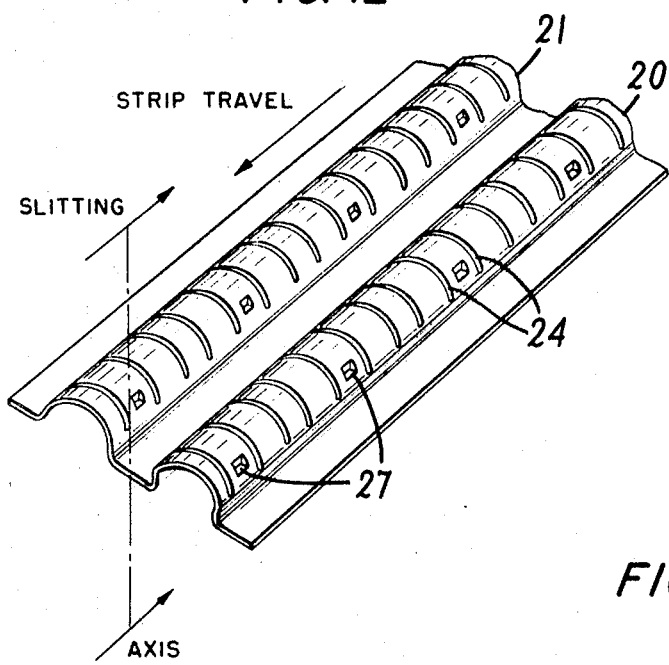
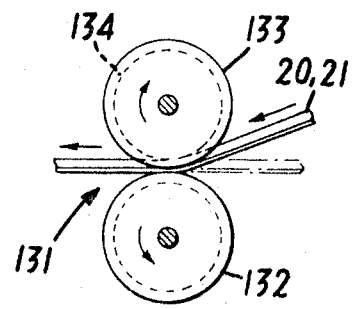
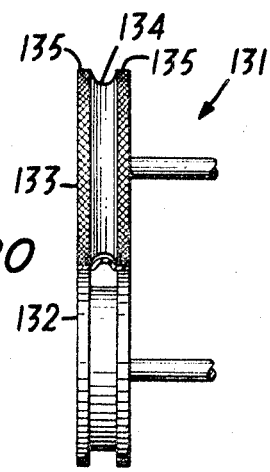
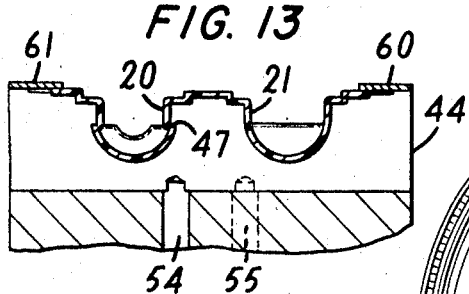
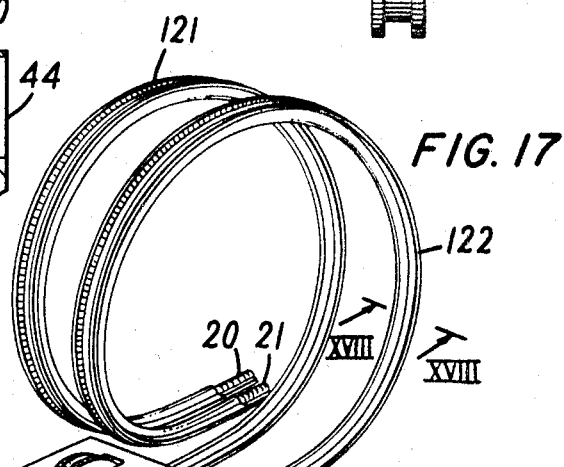
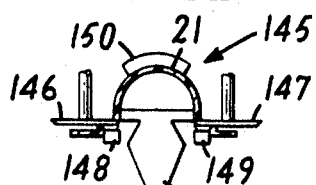
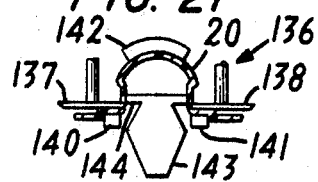
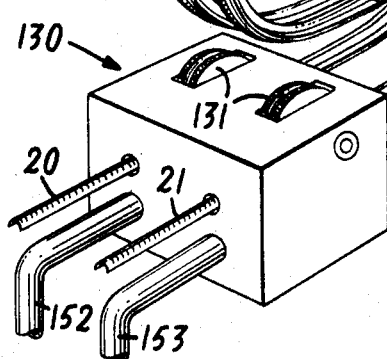

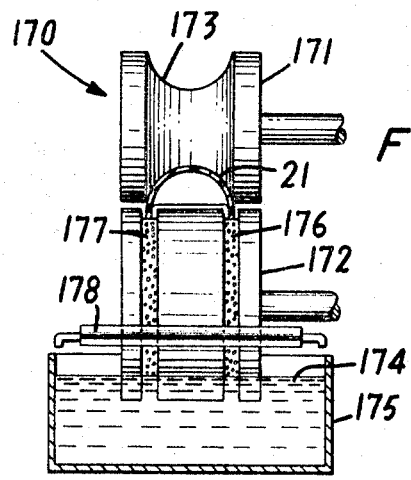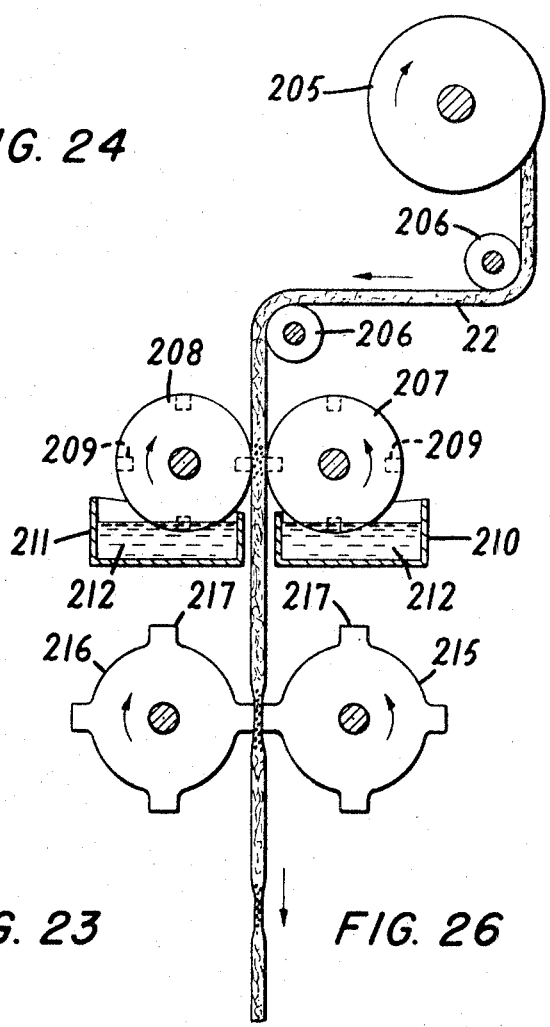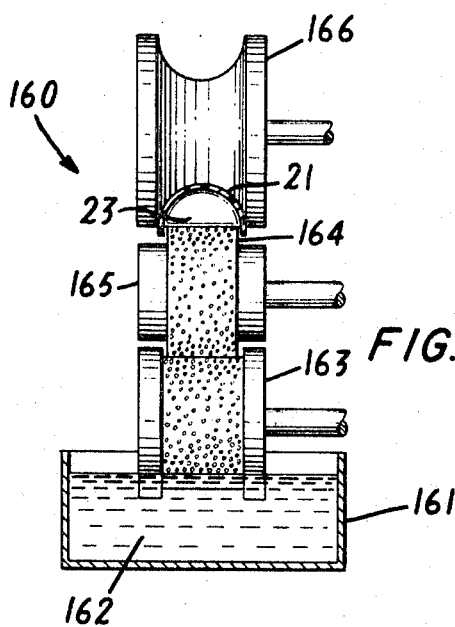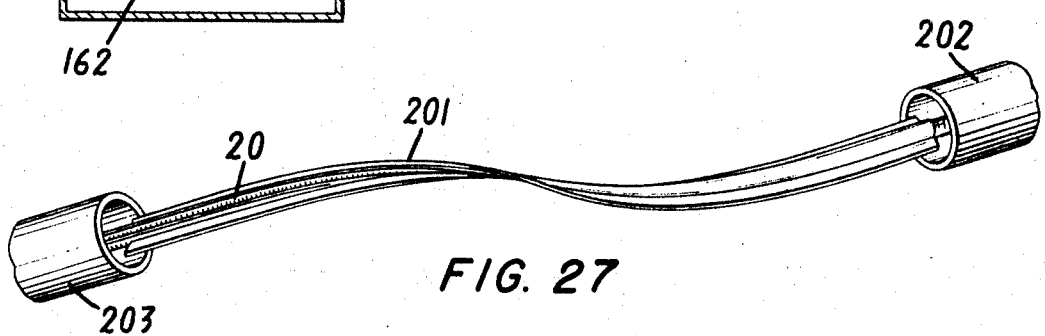

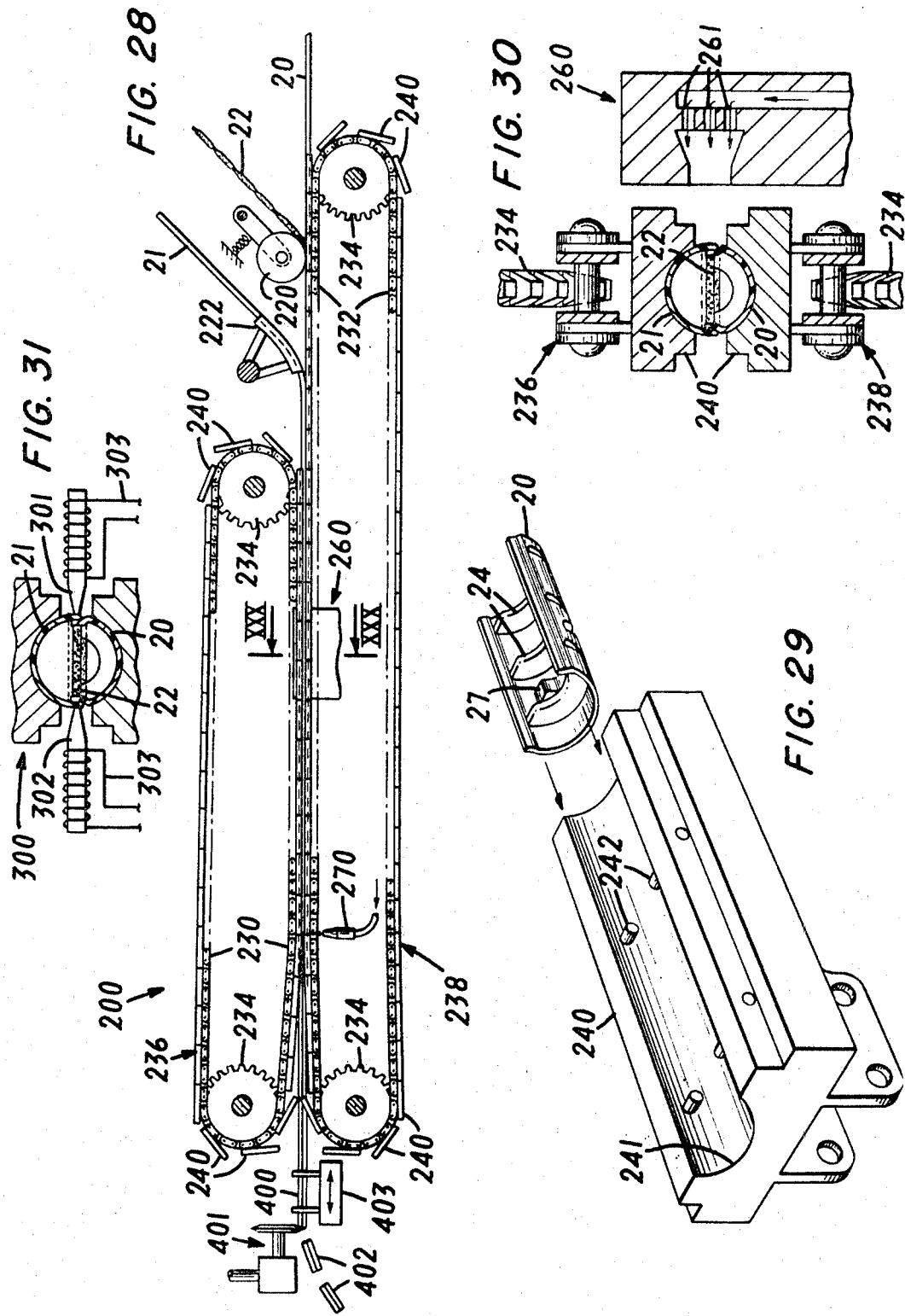

United States Patent Office 3,466,213
Patented Sept. 9, 1969

3,466,213
MANUFACTURE OF CONTINUOUS
TUBULAR ARTICLE
Wesley S. Larson, Hazardville, Conn., Richard L. Panicci, Westfield, Mass., and Richard N. Thomson and Jerome S. Osmalov, Richmond, Va., assignors to Philip Morris Incorporated, New York, N.Y., a corporation of Virginia
Filed Apr. 14, 1966, Ser. No. 542,518
Int. Cl. B29c 17/06; B32b 31/10; A32c 5/48
U.S. Cl. 156—245
31 Claims This invention relates to a method and apparatus for making tubular articles and is more particularly concerned with the manufacture of a continuous cigarette filter stock which can be severed into sections of predetermined lengths for use in cigarette manufacturing machinery.

Of the essential criteria governing the manufacture of cigarettes, the primary consideration is that the methods and apparatus for manufacture must be readily suited for making large quantities of cigarettes rapidly, economically, and with consistent quality. To adhere to this criteria there has been devised for the tobacco industry in the past, cigarette making machines capable of producing many thousands of cigarettes per hour. This machinery and the cigarette filling, rolling and cutting techniques attendant therewith are fully satisfactory for the intended purposes. With the now commonplace use of filters in cigarettes it becomes necessary that methods and apparatus employed for manufacturing the filter units be such that they are adapted readily to use with existing cigarette making methods and machinery. Furthermore, the filter itself has become the object of considerable development and may take various forms and include various filter compositions. Thus as new types of filters evolve, it is necessary to match these developments with provision of methods and apparatus for continuous production of the filter units in the immense quantities involved.

The present invention has for an important object the provision of a method and apparatus for making tubular cigarette filter elements, more specifically, filter elements comprised of two interfitting semi-cylindrical shell portions having a strip of filter material supported longitudinally in the assembled shell portions.

Another object is to provide a method and apparatus for making cigarette filters by thermoforming a relatively thin, continuous plastic strip in a continuous operation into shaped sections corresponding to the shell portions, the thermoforming being characterized by the fact that it involves a deep draw operation. The shaped sections are then assembled after a continuous strip of filter material is inserted in one, and the assembly is sealed.

Another object is to thermoform a continuous tubular article in a manner providing that the article may be easily severed into individual unit lengths without requiring finish trimming of the severed unit lengths.

Another object is to provide novel forms of apparatus for manufacturing tubular articles in a continuous operation.

Another object is to provide a method and apparatus for producing a novel type of cigarette filter in a continuous operation.

Other objects of the present invention will in part be obvious and will in part appear hereinafter.

The present invention is concerned with making in a continuous operation, a continuous stock of plastic cigarette filters of novel design. Specifically, each cigarette filter comprises a tubular shell having a strip of filter material supported axially centrally therein with suitable barriers in the shell diverting smoke drawn therein in one or more courses through the filter strip. In accordance with the teaching of the present invention, the cigarette filter elements may be made in a continuous operation by suitably shaping a continuous plastic strip into two longitudinal shell portions and thereafter slitting the strip to separate the two shell portions which are adapted to interfit one with the other so as to form a continuous tubular structure. The separated shell portions may thereafter be led through a series of devices which will properly orient the shell portions one with the other to facilitate eventual assembly, and which feed a strip of filter material therebetween before the shell portions are joined in assembled condition. Suitable means to seal the assembled shell portions are also provided as well as a device to impregnate and emboss spaced sections of the filter strip material before assembling the filter, the impregnated section of the filter strip acting as "anti-wicking" zones to prevent migration of nicotine, tars, etc. therethrough during smoking. The continuous filter assembly may thereafter be cut into smaller single unit or plural unit lengths for further use in the automatic cigarette making machinery wherein the filter unit is joined to the tobacco cylinder.

The invention accordingly comprises the several steps and the relation of one or more of such steps with respect to each of the others, and the apparatus embodying features of construction, combinations of elements and arrangement of parts which will adapt to effect such steps, all as exemplified in the following detailed disclosure and the scope of the invention will be indicated in the claims.

For a fuller understanding of the nature and objects of the present invention, reference should be had to the following detailed description when taken in conjunction with the accompanying drawings showing by way of example preferred embodiments of the inventive concept.

In the drawings:

FIGURE 1 is an exploded perspective view of the components comprising a filter assembly formed according to the method and with the apparatus disclosed in the present invention.

FIGURE 2 is a longitudinal sectional view taken on a vertical cutting plane passing through the axis of the continuous filter assembly in its assembled condition, an assembly of only several filter unit's length being represented.

FIGURE 3 is a longitudinal sectional view of a single filter unit which has been severed from the assembly shown in FIGURE 2, as embodied in a cigarette.

FIGURE 4 is a schematic representation of one form of the apparatus of the present invention which may be used for making the filter assembly shown in FIGURES 1 and 2 in a continuous operation, the apparatus illustrated being that used in the production line from the start of manufacture up to the point therein where the shell portions exit from precision trimmer units.

FIGURE 5 is a schematic representation of the remainder of the filter manufacturing apparatus from the precision trimmer unit station onward and illustrates the devices with which the two shell portions are brought into interfitting assembled relation one with the other at the assembling station at the exit of which the continuous assembly is severed into single filter unit or plural unit lengths.

FIGURE 6 is an edge elevational view of one embodiment of forming wheel utilized in the apparatus of the present invention and on which the continuous plastic strip may be formed into the two shell portions by means of a deep draw thermoforming operation.

FIGURE 7 is a fragmentary perspective view on enlarged scale of a peripheral segment of the hollow forming wheel shown in FIGURE 6 illustrating the hollow interior thereof which is maintained under vacuum and which communicates with the concave surfaces and radial baffles against which the continuous plastic strip is thermoformed to transform it from a thin flat shape to the shape shown in FIGURE 12.

FIGURE 8 is a fragmentary transverse sectional view showing the manner in which the radial baffles against which the strip is drawn are anchored in the forming wheel.

FIGURE 9 is a side elevational view of the forming wheel shown in FIGURES 6 and 7 with the side plate thereof at the side facing the viewer being removed to illustrate the seal device mounted therein to prevent communication of the periphery of the forming wheel with the vacuum within the wheel until near the end of the travel of the strip on the wheel at which time actual thermoforming of the strip occurs.

FIGURE 10 is a fragmentary transverse sectional view on enlarged scale of a peripheral portion of the forming wheel shown in FIGURE 7 illustrating the manner in which the vacuum seal device therein is pressed against the inner face of the forming wheel by means of a pressurized bladder.

FIGURE 11 is a sectional view on a further enlarged scale of the flexible bearing strip forming part of the vacuum seal device shown in FIGURES 9 and 10 showing the bearing surfaces thereon against which the forming wheel rides.

FIGURE 12 is a perspective view of a length of the plastic strip illustrating the shape into which it is thermoformed on the forming wheel, the shaped strip being shown in an inverted position for purposes of clarity.

FIGURE 13 is a fragmentary transverse sectional view of the peripheral portion of the forming wheel showing the manner in which the flat plastic strip is deformed against the forming grooves therein, and also illustrating the manner in which endless steel bands are used to press the strip tightly against the forming wheel outer face to prevent widthwise shrinkage of the strip during thermoforming.

FIGURE 14 is a side elevational view of the thermoforming wheel illustrating additional constructional features thereof.

FIGURE 15 is a fragmentary elevational view of a device used to strip the plastic strip from the thermoforming wheel after it has been shaped thereon.

FIGURE 16 is an elevational view of a device used for slitting the shaped strip longitudinally into the two separate shell portions as it exists from the forming wheel.

FIGURE 17 is a perspective view of a guide loop device onto which the separated shell portions of the strip are fed upon exiting the slitting device shown in FIGURE 16, the guide loop assembly being shown positioned adjacent the precision trimmer unit into which the shell portions feed from the guide loop assembly.

FIGURE 18 is a transverse sectional view of one of the tracks of the guide loop device shown in FIGURE 17 showing the manner in which the shell portion rides therein.

FIGURE 19 is a side elevational view of a pair of feed rolls utilized to drive the shell portions through the precision trimmer unit.

FIGURE 20 is an edge elevational view on slightly larger scale of the rolls shown in FIGURE 19.

FIGURE 21 is a fragmentary elevational view showing the manner in which one shell portion is trimmed in the precision trimmer unit to remove excess edge material therefrom.

FIGURE 22 is a view similar to FIGURE 21 showing the manner in which excess edge material is trimmed from the other shell portion in the recision trimmer unit.

FIGURE 23 is an edge elevational view of an adhesive applicator device for applying an adhesive film to the flat edges of the smoke barriers in the shell portions, the adhesive being provided for securing the filter strip to said barriers.

FIGURE 24 is an elevational view of a device employed for applying adhesive to the longitudinal edges of one of the shell portions prior to interfitting the other shell portion therewith.

FIGURE 25 is a fragmentary sectional view illustrating the joint between the assembled shell portions before the adhesive which was applied to the one shell portion is caused to run onto the other shell portion to air tightly seal the joint therebetween.

FIGURE 25a is the same as FIGURE 25 after the joint has been adhesively sealed.

FIGURE 26 is a schematic representation on enlarged scale of a device employed for impregnating and embossing the filter strip material at longitudinally spaced locations preliminary to assembly of the continuous filter assembly.

FIGURE 27 is a perspective view of a turning device used for turning one of the shell portions 180° to properly orient same for interfitting it with the other shell portion.

FIGURE 28 is a side elevational view on enlarged scale of a conveyor-assembler device used to join together the two shell portions, effect adhesive connection between the latter, and insure that proper longitudinal mating register exists between the said shell portions so as to facilitate later severence of the assembled shell into individual filter units of identical character.

FIGURE 29 is a perspective view of one of the saddle blocks used in the conveyor-assembly device for supporting the filter assembly, showing the guide pins which engage shoulders on the shell portions to insure proper longitudinal register therebetween.

FIGURE 30 is a transverse vertical sectional view through the conveyor-assembler device illustrating the heating unit therein used for heating the adhesive when sealing the shell assembly.

FIGURE 31 is a view similar to FIGURE 30 showing an alternate heater unit construction.

Throughout the description like reference numerals are used to denote like parts in the drawings.

The present invention discloses as particular embodiments, a method and apparatus for forming continuous tubular cigarette filter assemblies. It should be understood, however, that both the method and the apparatus have a more general utility and may be advantageously employed for producing other rigid or semi-rigid tubular structures, as for example, plastic pipe. It may also be used for encapsulating pills, foodstuffs and similar articles.

The cigarette filter produced according to the present invention is of itself of novel construction and is shown in detail in FIGURES 1 to 3, FIGURE 3 illustrating the manner in which the individual filter unit 10 is intended to be used along with a paper cylinder 11 filled with tobacco 12 to form a cigarette 13. The details of the filter unit 10 are more specifically shown in FIGURES 1 and 2 wherein it will be noted, it comprises interfitting semi-cylindrical shell portions 20 and 21 which for convenience of description hereinafter will be termed "male and female shell portions" respectively, with a strip of filter material 22 being supported therebetween and extending centrally axially in the shell assembly. As used herein "interfitting" is intended to mean at least two parti-cylindrical structures adapted to fit together to form a hollow cylinder. The structures may include thereon interengaging surfaces constituting male and female joint means as will be described or they may be fabricated without interengaging surfaces and be fitted together in a butted surface-to-surface relationship. Each shell portion 20, 21 is rovided with generally semicircular discs 23 constituting a smoke barrier functioning as will appear. Furthermore, each shell portion 20, 21 includes between succeeding smoke barriers one or more axially spaced supporting ribs 24 formed as segments of a hollow semi-circular disc as best seen in FIGURE 1. The supporting ribs 24 and smoke barriers 23 are formed integrally by striking the shell portion material inwardly from the outside of the shell, the latter being effected during the formation of the respective shell portions in the manner and according to the method to be described later on in the description.

The filter unit functions as seen in FIGURE 3, that is to say, smoke from the lighted cigarette 13 follows the path denoted by the heavy arrows through the tobacco 12 and enters the filter unit 10 at one side of the filter strip 22 being barred from entering the filter unit at the other side of the filter strip by the smoke barrier 23 located at the tobacco end. The smoke thus enters one of two chambers formed in the filter unit 10 the said one chamber being blocked at the smoking end by means of another barrier 23. Thus, the smoke, to exit from the filter unit 10 must pass through the filter strip 22 in a direction transverse to normal axial flow in order to exit by way of the other chamber. The ends of the filter strip 22 are each impregnated with a suitable impregnant material such as a resin and embossed as shown at 25 to densify the strip and prevent smoke or "wicking" substances from passing therethrough. "Wicking" is understood by those skilled in the art to denote the migration of nicotine, tars and other distasteful particles through a filter material from the tobacco to smoking ends of the filter unit during the course of smoking.

It will be noted from FIGURE 3 that each individual filter unit 10 includes at least one smoke barrier 23 in each of the male and female shell portions 20, 21 and that the barriers 23 are oppositely oriented respective to the filter strip at the opposite ends of the filter unit. Since the present invention contemplates production of the filter units in a continuous stock form from which individual or plural filter unit lengths are severed, the repeating shape patterns of the shell portions will include an arrangement of the respective barriers 23 alternately in the respective male and female portions 20, 21 as seen in FIGURES 1 and 2 to provide proper orientation thereof in the individual filter unit sections. Thus as seen particularly in FIGURE 2, the continuous filter assembly will include successive individual filter units 10, 10a, 10b etc., each having respective shell portions 20, 21, 20a, 21a, 20b, 21b; filter strips 22, 22a, 22b and so on. Those skilled in the art will understand that the shell portions could also be designed to include several smoke barriers in each individual filter unit length thereby to cause the smoke to have to make two or more passes through filter strip before exiting from the filter. Other details of the filter construction will become apparent during the course of the description particularly as fuller elaboration of the various devices for forming the male and female shell portions is made.

The method and apparatus of the present invention are intended to produce cigarette filters in a continuous operation at speeds compatible with the manufacturing capacities of present day high speed cigarette making machines and commensurate with the production levels prescribed for economical manufacturing procedures. Suitable for producing filters as shown in FIGURE 3 is the apparatus represented generally schematically in FIGURES 4 and 5. Referring now to the latter figures, reference numeral 30 represents one or more supply reels whereon may be mounted a supply of the material from which the tubular assembly is formed. In the represented embodiment the material is a plastic strip 31 made of a suitable material as for example, a polystyrene-butadiene copolymer of approximately one and three-sixteenth inches width, the latter being a dimension sufficient to provide a tubular section of circumferential dimension substantially corresponding with that of an average size cigarette. The plastic strip 31 on being unwound from the reel 30 is led through a pair of support-guide rollers 32, 33 located adjacent an accumulation bin 34, the purpose of which will now be described.

The method of the present invention provides a fully continuous manufacturing capacity. Thus it is required that periodically a changeover from a depleted to a loaded supply roll be effected to maintain the operation without break in continuity. To facilitate changeover, accumulation bin 34 is intended to provide a sufficient reserve supply of the strip to enable continued operation of the apparatus during changeover. The accumulation may be made by using roller 32 as a high speed driver to feed strip from the reel at a speed in excess of the normal operation strip speed thereby causing an excess of strip to feed into the bin 34. This accumulation is thus available to supply the apparatus during the time period required to splice the strip end from the depleted reel onto a fresh reel. In the described embodiment, i.e., manufacturing plastic cigarette filter assemblies, the strip speed is maintained at a rate consonant with the requirements of economical cigarette manufacturing practices. On passing from the accumulation bin 34, the strip 31 is led through another set of support-guide rollers 35, 36 and enters a strip tensioning controller device 37 wherein the strip line speed may be regulated in known manner to the intended value.

The plastic strip 31 is adapted to be thermoformed, i.e., shaped by first heating it and then forming same against a die, the forming being effected without recourse to use of any forming means external of the die to form the strip thereon. Thus the strip 31, upon leaving the strip tensioning controller 37 is fed through a preheater assembly 38 wherein the strip temperature is raised to a controlled level not in excess of the highest temperature at which the strip will retain its generally flat shape. From the preheater 38, the strip is fed onto a forming wheel assembly generally denoted at 40 wherein the strip is shaped into the two semi-cylindrical portion shapes previously described. The forming wheel 41 which is the most important element of the assembly, is shown in greater detail in FIGURES 6 to 14 wherein it will be noted that it is a generally hollow structure comprised of a pair of flat side plates 42, 43 and an annular ring 44 the latter being provided around its peripheral surface with a set of grooves or molding surfaces 45, 46 wherein the plastic strip 31 may be thermoformed into the integral male and female shell portions 20, 21 respectively in the manner shortly to be described. In the particular embodiment shown, the molding surfaces 45, 46 are provided by forming in the annular ring a pair of parallel spaced, concave grooves extending around the periphery thereof in a continuous path. One of the grooves 46 is of generally semi-circular section for shaping the female shell portion 21 whereas, the other groove 45 is of parti-circular section, being shouldered inwardly as at 47 as may be discerned from FIGURE 13 and is used for shaping the male shell portion. The annular ring 44 is also provided at both sides with circumferentially spaced tapped holes 48 for receiving screws 49 or similar fasteners by means of which the side plates 42, 43 are secured to the annular ring to form the wheel assembly.

The respective shell portions 20, 21 of the filter assembly each include therein the repeating pattern of barriers 23 and supporting ribs 24 which are formed by shaping the plastic strip 31 against a series of transverse baffle plates 50 extending through the grooves 45, 46 and the arrangement of which will now be described. The annular ring 44 is provided with a series of transverse slots 51 extending radially inwardly from the outer periphery thereof and extending a distance below the grooves 45, 46 as seen in FIGURE 7. The slots 51 are adapted to receive the baffle plates 50, the baffle plates being relatively thin and being shaped to have surfaces against which the barriers 23 and supporting ribs 24 of the shell portions are formed. Thus one baffle plate will have a straight upper edge 52 extending through one groove to form a barrier 23, whereas the same plate where it extends through the other groove will have a parti-circular recess 53 to permit the plastic strip to form thereagainst in the shape of a segment of a hollow semi-circle corresponding to the shape of the supporting ribs 24 (FIG. 10). The arrangement and shape of the baffle plates 50 in the other slots 51 will follow the pattern of the supporting ribs and smoke barriers in the manner necessary to shape them accordingly.

The baffle plates 50 are anchored in the annular ring 44 in the manner shown in FIGURES 7 and 8 which show how each baffle plate is provided with slots 29 which align with similar slots 29a in the annular ring 44 to form a channel for receiving an anchor strip 39 which securely holds the baffle plates in place.

Each transverse slot 51 formed in the annular ring communicates with the inner periphery of the annular ring by means of a pair of slotted ports 54, 55 located at opposite sides of the transverse slot 51 and open thereto and each being formed below one of the molding grooves 45, 46 as shown in FIGURES 7 and 10. In this manner the slots 51 and hence the molding grooves may be placed in communication with a vacuum maintained inside the forming wheel as will be described later in the description.

Referring once again to FIGURE 4, as the plastic strip 31 enters onto the peripheral face of the annular ring part of the forming wheel 41 covering the molding grooves therein, there is simultaneously fed over the side edge portions of the strip, a pair of endless steel bands 60, 61 which in operation traverse the path denoted by the arrows around the rollers 62–66. The purpose of the endless steel bands 60, 61 is more clearly indicated in FIGURE 13 wherein it will be noted that they engage on and securely hold the side portions of the plastic strip 31 tightly against the peripheral edge portions of the annular ring 44 and in this manner prevent a widthwise shrinkage of the plastic strip as it is being formed into the male and female shapes. Also, the pressure with which the steel bands hoid the strip against the annular ring also serves as a seal means to prevent air entry to the interior of the forming wheel which is maintained under vacuum as will be described.

In its passage around the forming wheel 41, the plastic strip 31 preliminary to the actual formation therein of the male and female shell portions 20, 21 respectively, is subjected to a further heating to bring it to a near plastic state, the heating being effected by means of a heater unit 68 which extends around a segment only of the path of rotary travel traversed by the forming wheel 41 as may be best seen in FIGURE 4. Accurate control of the temperature level of the plastic strip may be maintained by altering in known manner the radial position of the heater unit 68 relative to the peripheral face of the forming wheel. It will be apparent that the strip 31 does not actually move around the forming wheel 41 but in fact is carried through a circular path by the forming wheel as it rotates. In other words, there is no differential in lineal speed between the periphery of the forming wheel 41, the strip 31, or the endless steel bands 60, 61.

Referring once again to FIGURE 6 the forming wheel 41 is provided with a hollow hub 70 at the rear side which is connected by means of a suitable conduit 71 with a source of vacuum. In this manner the interior of the forming wheel may be maintained under a vacuum of about 20–25″ Hg as it rotates. The front side of the forming wheel is also provided with a hub member 72 to which is connected a flexible conduit 73 by means of which air under pressure may be supplied to a vacuum sealing assembly 80 illustrated in detail in FIGURES 9, 10 and 11. Those skilled in the art will readily understand that the manner of connecting the conduits 71 and 73 with the forming wheel involves providing suitable sealing means (not shown) associated with each to prevent atmospheric air from entering the forming wheel.

Actual shaping of the conditioned plastic strip 31 is effected on the forming wheel 41 only during the terminal portion of the strip travel in its circular path while on the forming wheel and more specifically as the strip travels the arcuate segment denoted in FIGURE 9 by the symbol α. Thus the effect of the vacuum within the forming wheel due to the effect of the vacuum within the forming wheel at points other than the segment α, the sealing assembly 80 is employed. The sealing assembly 80 comprises a seal plate 81 the upper face of which is slotted as at 82 so as to form bearing shoulders 83, 84 at the sides thereof, the bearing shoulders being inclined at the edges as at 85 and having relatively narrow top flats to minimize the friction generated by the movement of the inner peripheral face of the annular ring thereagainst (FIGURES 10 and 11). The seal plate 81 is a relatively thin member, i.e., ³⁄₁₆″ and is of a flexible character so that its bearing shoulders 83, 84 may be pressed into uniform contact with the inner periphery of the annular ring 44 by means of a pneumatic bladder 90 which exerts a pressure on the seal plate 81 and is maintained in an expanded condition by air delivered under pressure through flexible conduit 73. To provide that uniform pressure is exerted on the seal plate 81 by the bladder 90, the former is provided at its lower surface with slots which receive longitudinally extending wire strips 86 which in turn are engaged by transverse pins 91 resting on the bladder as shown. The sealing assembly 80 may be supported in a known manner in a fixed position within the forming wheel, for example, by means of struts 87 mounted on a fixed hub part 88 within the wheel assembly as shown in FIGURE 9. The flats 86 on the seal plate are preferably coated with a layer of glass impregnated Teflon 92 (FIG. 10) to reduce further the friction of the travel of the annular ring 44 thereon. The ends of the seal plate 81 may be provided with chevron ribs or other sealing means (not shown) to prevent the vacuum from investing the slot 82 therein and thereby being communicated to the periphery of the forming wheel at unwanted locations. As seen in FIGURES 9 and 10, the function of the sealing assembly 80 is to prevent communication of the slotted ports 54, 55 in the annular ring 44 with the vacuous state inside the forming wheel except in the segment α in which segment the shaping of the strip is effected by reason of the difference in pressure between the outer and inner faces of the flat strip 31. The differential pressure which is effective only in the segment α will force the plastic strip into the male and female grooves 45 and 46 molding it into the shape shown in FIGURE 12.

During the actual shaping of the strip 31 on the forming wheel 41, a flow of air is directed onto the strip from a pipe 94 (FIG. 14) fixed at a distance from the face of the forming wheel as shown. The air (denoted by the arrows in FIGURE 14) emanating from the pipe 94 is a coolant acting as a quenching medium to set the strip shape and inhibit any stretch thereof as it is led off the forming wheel.

To facilitate removing the now formed strip 31 from the forming wheel 41, an additional blast of cool air may be directed from a nozzle 100 intermediate the strip and the face of the forming wheel so that it will function in conjunction with a set of stripping fingers 101–103 (FIG. 15) to remove the strip from the forming wheel without damaging same or deforming any of the shaped contours thereon.

The cooled and formed strip 31 on leaving the forming wheel 41 is now comprised of a continuous body of plastic having shaped therein the longitudinally extending integral male and female shell portions 20, 21 as shown in FIGURE 12. Inasmuch as the semi-cylindrical shell portions each represent one-half of the tubular shell structure of the filter assembly it is necessary to separate them for further processing and ultimate assembly. To that end, the shaped strip on leaving the forming wheel is immediately fed through a slitter device 110 (FIGURES 14 and 16) which may comprise a rotary cutter disc 111 or other suitable cutting means, the strip 31 being supported on a suitable roller 112 during the cutting. The slitter device 110 functions to separate the formed strip 31 into the separate and continuous length male and female shell portions 20, 21 shown in FIGURE 1, by slitting the formed strip along its longitudinal axis as indicated in FIGURE 12.

As the now separate male and female shell portions 20, 21 leave the slitter device 110, they feed through a guide loop assembly generally indicated at 120 in FIGURE 4 and illustrated in more detail in FIGURE 17. The guide loop assembly 120 comprises a pair of generally circular track members 121, 122 providing each a separate track for the male and female shell portions 20, 21 respectively and supported adjacent to the forming wheel in any convenient manner. The track members 121, 122 are formed so as to diverge one from the other in a direction away from the point of entry of the male and female shell portions 20, 21 thereon with the outer periphery of each member being provided with a channel-like track to receive the respective shell portions. A square or rectangular track is preferable to one corresponding in section to the shape of the shell portions, since only point contacts of the strip and the track are involved thus minimizing the friction created in travel around the assembly. Furthermore, as seen in FIGURE 18, the shell portions may ride in the track members 121, 122 on a blanket of air supplied to the tracks by means of pipes connected therewith at locations along the track run. The air thus further reduces the friction of travel of the shell portions on the guide loop assembly. It will be appreciated by those skilled in the art that the male and female shell portions 20, 21 on exiting the forming wheel 41 must be laterally displaced a distance to pass down the production line and that in undergoing change from a circular to a laterally displaced straight run will have a certain amount of hoop-forming tendencies imparted thereto. The guide loop assembly 120 relieves this hoop-forming tendency in the shell portions and facilitates directing them down the production line to the next station at which excess material is trimmed from the shell portions.

The male and female shell portions 20 and 21 on leaving the guide loop assembly 120 enter a precision trimmer assembly 130 (FIGS. 5, 17, 21 and 22) each being fed through same by means of a separate set of feed rolls 131 (FIGURES 19 and 20).

Each set of feed rolls 131 includes a support wheel 132 and a feed wheel 133 which has a concave groove 134 therein receiving the corresponding part of the shell portion, and a pair of knurled flanges 135 which engage the side edges of the shell portion and thereby drive same. In directing the respective shell portions into the feed rolls 131 they are led in an arcuate path as distinguished from the straight in feed in phantom detail in FIGURE 19. It was found that the latter facilities achieving an absolutely straight trimming of the edges of the shell portions in the precision trimmer assembly whereas a straight line feed was found to result in wavy edge cuts. The precision trimmer assembly 130 itself includes suitable cutting devices for trimming excess material from the respective shell portions which pass therethrough with their convex surfaces facing upwardly. As seen in FIGURE 21 the precision trimmer assembly 130 includes a male cutter portion 136 including a pair of rotating knives 137, 138 which trim off the excess edges at the sides of the male shell portion without leaving any finned projections remaining thereon. During cutting, the shell portion may be supported as at 140, 141 and 142. Furthermore, an anvil 143 may be provided inside the shell portion to prevent undue inward flexing of the side walls thereof during cutting, the anvil being shouldered as at 144 to provide clearance for the cutter knives.

The precision trimmer assembly 130 also includes a female portion 145 (FIG. 22) having separate rotating knives 146, 147 for trimming the longitudinal edges of the female shell portion 21 with suitable supports 148–150 being provided to support the shell portion during trimming as well as an anvil 151 to prevent wall flexure in the shell portion. The trimmed residue resulting from trimming of the respective shell portions is directed to a suitable collector (not shown) by means of waste tubes 152, 153 connected with the precision trimmer assembly 130.

Referring once again to FIGURE 4, the female shell portion 21 on leaving the precision trimmer assembly 130 passes through an adhesive applicator device 160 which is shown in detail in FIGURE 23 and is used to apply a film of adhesive to the flat edges of each of the barriers 23 and the flat surfaces of each supporting rib 24 therein which when the shell is assembled will align with a barrier in the male shell portion, the adhesive being utilized to secure the filter strip 22 to said surfaces as shown in FIGURE 2. The adhesive applicator device includes a tank 161 containing a bath 162 of adhesive through which rotates a pickup roller 163 designed to transfer the adhesive to the outstanding periphery 164 of an applicator roller 165 rotating in unison with the pickup roller. The device further includes a shell locating roller 166 which is provided with a concave groove adapted to receive the similarly contoured shell portion. The applicator roller 165 is adapted to print a thin film of adhesive on the flat surfaces of the smoke barriers 23 and ribs 24 as previously described. A similar adhesive applicator device which is not shown in the drawings is also used from printing a film of adhesive on the barriers and supporting ribs in the male shell portion 20.

On leaving the adhesive applicator device 160, the female shell portion enters a case adhesive applicator device 170, the latter being used for applying a hot melt adhesive to the female shell portion 21 with which the assembled shell portions are held together, the device comprising an upper and lower roller arrangement 171 and 172 respectively. Greater detail of the case adhesive applicator construction is shown in FIGURE 24 wherein it will be noted the upper roller 171 serves as a driver for advancing the female shell portion 21 along in its travel and to that end is provided with a concave groove 173 at its periphery corresponding in shape with the shape of the female shell portion. The lower roller 172 rotates through a bath 174 of a hot seal adhesive as for example, molten wax, which is confined within a reservoir 175 and maintained therein in molten state in known manner. The roller 172 is provided as shown with a pair of continuous grooves 176, 177 in its periphery which fill with adhesive 174 as the roller 172 rotates through the bath. The positioning of the rollers is such that the edges of female shell portion 21 ride in the grooves 176, 177 and have a coating of adhesive deposited thereon as shown in FIGURE 24 and which is adapted to serve the function of an adhesive for joining the shell portions in assembled condition as will appear hereinafter. A doctor bar 178 is used to wipe excess adhesive from the periphery of roller 172 being mounted as shown on the top of the reservoir 175. It will be obvious to those skilled in the art that various other types of adhesives but preferably low melting temperature adhesives may be employed for joining the male and female shell portions, the selection of low melting temperature materials being desirable to obviate causing distortion in the shell portion material when reheating the adhesive during actual assembly of the male and female shell portions.

Upon exiting from the case adhesive applicator device 170, the female shell portion 21 as shown in FIGURE 5 is subjected to a cooling action of an air blast within a cooler chamber 179, so as to accelerate solidification of the hot melt adhesive 174 on the longitudinal edges of the shell portion. It will be readily understood that it is advantageous at this point in the forming operation to cause the adhesive on the shell portion edges to solidify so as to prevent it from wiping off the shell portion and on to the other machinery parts before the actual joining together of the male and female shell portions. On leaving the cooling chamber 179, the female shell portion 21 may be led in any convenient path to properly position it preliminarily to the actual joining together or assembly of the male and female shell portions, the particular upwardly directed path wherein the female shell portion passes over guide roller 180 being representative of one such path.

Referring once again to FIGURES 4 and 5 and the travel of the male shell portion 20 as it leaves the precision trimming device 130, the male shell portion is directed toward a conveyor-assembler device generally denoted by reference numeral 200 which performs a number of functions as will be described. The conveyor-assembler comprises the subject matter of and is described in greater detail in the patent application of Walter Mutter entitled "Apparatus for Assembling Continuous Tubular Article from Two or More Continuous Parti-tubular Sections" filed on even date herewith. It will be noted that the male shell portion 20 is at this point oriented such that its outside convex surface is directed upwardly. It thus becomes necessary to orient the male shell portion 180° so that its outer surface is pointed downwardly to permit the after described filter strip 22 to be inserted therein. For turning the shell portion 20, there is employed a turning device 201 as shown in FIGURE 27 in the form of a flat bar having a half-twist therein and thus being arranged to effect a smooth transitional inversion of the male shell portion while it moves along at the production line speed. The turning bar may be provided with a track therein similar to those used in the guide loop assembly 120 and it may be connected at its ends with suitable guide tubes 202, 203 through which the male shell portion passes at various stages in the production line. The turning bar 201 itself may also be enclosed in a tubular structure.

In conjunction with the feed-in of the male and female shell portions 20, 21 to the conveyor-assembler 200, there is fed intermediate the merging shell portions, a continuous strip 22 of filter material such as felt, cellulose composition, etc. Preliminary to that operation, however, the filter strip 22 may be impregnated and embossed as described earlier in the description. To that end and as seen in FIGURE 5 and in greater detail in FIGURE 26, the filter material may be stored on a reel 205 and fed therefrom around a series of idler rollers 206 into the nip of a set of impregnant applicator or printing rollers 207 and 208. The applicator or printing rollers 207, 208 are each provided with a series of circumferentially spaced peripheral slots 209 extending parallel to the axis of rotation so that as the rollers 207, 208 rotate through the pots 210, 211 respectively, there is picked up in the slots 209, a quantity of molten resin or similar impregnant 212 maintained in molten bath form in the pots. The nip of the rollers is dimensioned to be substantially equivalent with the thickness of the strip 22 so that the latter in pasing therethrough has a surface printing of impregnant deposited thereon from the slots 209 in the rollers. The strip is in this manner impregnated with resin at uniformly spaced locations on its opposite faces. The resin impregnated filler strip 22 is then advanced through a set of heated embossing rollers 215 and 216 which are each provided with a series of radially outwardly extending lands or projections 217. The lands 217 are uniformly circumferentially spaced and the embossing rollers 215, 216 rotate in unison so that companion lands 217 on the respective rollers will register to compress the strip passing therethrough at the resin impregnated locations and thereby affecting an embossing of same.

The filter strip material 22 is then led around idler roller 218 (FIG. 5) located a distance above the advancing male shell portion 20 and led therefrom downwardly in a suitable path intended to merge with that of the advancing male shell portion. The filter strip material 22 then feeds under a spring loaded wheel assembly 220 (FIGS. 5 and 28). The wheel assembly 220 which also could be a pressure finger device, inserts the filter strip 22 into the male shell portion 20 pressing it against the barriers 23 and support ribs 24 therein achieving a seal of the strip against the barriers and supporting ribs by reason of the adhesive previously applied to the latter mentioned surfaces. A little further down the line, the female shell portion 21 feeding from cooler 179 is led in a fixed path intended to facilitate assembly being eventually brought down under a guide block assembly 222 located just above the composite sub-assembly of the male shell portion 20 and filter strip 22 so as to bring the three components into mating assembly.

As part of the conveyor-assembler 200 there is provided upper and lower chain assemblies 230, 232 respectively, which are driven by means of sprockets 234. The upper and lower chain assemblies each have mounted thereon a series or train of conveyor blocks 236 and 238, the respective trains having a substantially registering straight run with the blocks 240 in each train having concave central surfaces 241 as indicated in FIGURE 29 and registration pins 242 extending transversely of the longitudinal axis of the blocks as shown. The upper train of blocks 236 are intended to engage the female case 21 whereas, the lower train blocks 240 engage the male case 20 with the vertical spacing of the trains 236, 238 along their substantially straight registering runs being such that they force the respective male and female shell portions into interfitting asembly with the filter strip 22 which is supported therebetween being firmly pinched by the barriers 23 on one shell portion against a supporting rib 24 in the other, this arrangement of ultimate assembly being best seen in FIGURE 2.

It should be understood that it is necessary when bringing the three assembly elements (shell portions 20 and 21 and filter strip 22) together in assembly in the conveyor-assembler 200 to have proper longitudinal registration between the elements. Thus as seen in FIGURE 2, the barriers 23 in female shell portion 21 must align axially with a support rib 24 in the male shell portion 20 and vice versa. Similarly the remaining ribs 24 in each shell portion intermediate the barriers 23 must align axially. And of course, the filter strip 22 must be properly registered within the tubular shell with the barriers 23 abutting or pinching the various resin impregnated and embossed sections 25 at the terminal portions of said sections. This registration is preferably maintained by controlling with exactitude the line speed of the various elements. However, it requires only an infinitesimal variation in one to create a misregistration and so to obviate this and insure proper registration, the respective male and female shell portions 20, 21 are provided with formed shoulders 27 (FIGS. 2 and 12) which are shaped in the shell portions on the forming wheel 41. These shoulders are intended to be aligned axially in the assembled shell and if so aligned preclude misregistration. Alignment is effected by the registration pins 242 in each block in the trains 236, 238, which engage in the shoulders. The foregoing, of course, requires that each block in one train be maintained in alignment with a companion block in the other train at least during the registering straight run. The engagement of the pins 242 in the shoulders 27 of the corresponding male and female cases also serves to advance the filter assembly through the conveyor-assembler unit. As soon as the male and female shell portions 20, 21 enter the conveyor-assembler 200 they are forced together in an interfitting position forming a contiguous tubular structure with the filter strip 22 being supported centrally longitudinally therein. To facilitate the latter, the adhesive covered longitudinal edges of the female shell portion 21 may be formed so as to constitute a female joint means. On the other hand, the longitudinal edges of the male shell portion 20 are crimped inwardly as at 26 (FIG. 1) so as to constitute a male joint means engageable with the female joint means.

Shortly after the case portions are mated together the composite assembly passes through a shoe heater device 260 located within the conveyor-assembler 200 which directs heated air through suitable passages 261 (FIG. 30) and onto the joint of the assembly to remelt the adhesive 174 previously applied to the female shell portion 21 (FIG. 25) in the case adhesive applicator device 170. The melted adhesive 174 then runs in sufficient quantities on to the male shell portion 20 as shown in FIGURE 25a to effect an adhesive bonding together of the two shell portions when the adhesive once again solidifies. The adhesive also functions as a sealant at the joint of the shell portion to prevent ingress of air to the filter unit during smoking. To facilitate proper adhesion particularly of the properly registered male and female shell portions 20, 21 jets 270 are provided within the conveyor-assembler 200 to direct a cooling stream of air around the shell joint to solidify the adhesive.

An alternate form of heater device 300 for remelting the adhesive during assembly is illustrated in FIGURE 31. It is a contact heater provided with a pair of heating irons 301, 302 located one at each side of the assembly and having smooth tips engaging the joints of the assembly and adapted to transfer heat by conduction to the adhesive on the female shell portion 21. The heating irons may be maintained in a heated condition by known means as for example, electrical resistance wiring 303.

On leaving the conveyor-assembler 200 the now fully assembled filter assembly 400 advances past a rotary cutter device 401 which may sever the assembly into a number of length or "rods" 402 each of predetermined length, as for example, eighty millimeters corresponding to four individual filter unit lengths of twenty millimeters each. The four individual unit length "rods" 402 may then be delivered by known means (not shown) to automatic cigarette packaging machinery wherein they will be cut up further into individual filter lengths and joined to tobacco cylinders to form cigarettes of the character depicted in FIGURE 3. To prevent undesirable filter assembly rotation during cutting, a clamping ledger 403 or similar device for holding the filter rod may be provided.

From the foregoing description it will be appreciated that the method and apparatus disclosed in the present invention for forming in a continuous operation a continuous assembly of cigarette filter stock offers a number of advantages, including:

(a) Utilization of a thermoforming involving a deep draw operation yields high productivity per unit quantity of plastic stock.

(b) No wastage of filter rod assembly is involved as the repeating pattern of shell portion shapes is such that the end of one filter unit length is the beginning of the next.

It will thus be seen that the objects set forth above among those made apparent from the foregoing description, are efficiently attained and, since certain changes in carrying out the above method and in the constructions set forth, which embody the invention may be made without departing from its scope, it is intended that all matter contained in the above description shall be interpreted as illustrative and not in a limiting sense.

What is claimed is:

1. A method for forming a continuous tubular cigarette filter rod comprised of at least two interfitting longitudinal parti-tubular sections each having a repeating pattern of integral transverse smoke barriers and supporting ribs therein which comprises advancing a continuous strip of moldable material longitudinally onto a rotating forming wheel having separate endless molding grooves extending around the periphery thereof with the strip covering said molding grooves, said molding grooves having each a shape adapted to shape one of said sections, drawing the strip into said molding grooves to shape the respective parti-tubular sections therein, removing the shaped strip from the forming wheel and severing it longitudinally into the respective sections, and thereafter bringing the shaped sections into registering assembly with the smoke barriers in one section axially spaced relative to the smoke barriers in the other section and aligned with a supporting rib in said other section.

2. The method of claim 1 wherein the strip is drawn against the molding surfaces during a portion only of the time it is on said forming member.

3. The method of claim 2 wherein the strip is heated to a near plastic state while on the forming member and before being drawn against the molding surfaces.

4. The method of claim 1 wherein a vacuous condition is established in the molding surfaces to draw the strip thereagainst for shaping the sections.

5. The method of claim 1 further comprising clamping the strip to the forming member at least during the time it is being drawn against the molding surfaces.

6. The method of claim 1 further comprising applying adhesive to the interfitting portions of one of the sections prior to assembling it with the other section.

7. The method of claim 6 wherein said adhesive is a heat activated type, the adhesive being heated after assembly of the sections to effect an adhesive connection therebetween.

8. The method of claim 1 further comprising feeding a continuous strip of filter material longitudinally intermediate the shaped sections as they are brought into registering assembly.

9. Apparatus for forming a continuous tubular cigarette filter rod comprised of two interfitting parti-tubular longitudinal sections each having a repeating pattern of integral transverse smoke barriers and supporting ribs therein which comprises a rotatable forming wheel having a pair of continuous molding grooves extending circumferentially around the periphery thereof for forming the respective sections, each of the molding grooves having a shape adapted to shape one of the parti-tubular sections, means for advancing a strip of thermoplastic material onto the forming wheel in the direction of and covering said molding grooves, means for reducing the pressure in said molding grooves thereby to draw said strip into said grooves and shape the respective sections therein, means for removing the shaped strip from said forming wheel and severing it longitudinally into said separate sections, means for assembling said parti-tubular sections into a continuous tubular article with the smoke barriers in one section axially spaced relative to the smoke barriers in the other section, and aligned with a supporting rib in said other section.

10. Apparatus in accordance with claim 9 wherein the molding grooves are of generally semi-circular cross-section.

11. Apparatus in accordance with claim 9 wherein the means assembling the sections includes a device to orient the respective sections to bring the open faces thereof into juxtapositioned register during assembling.

12. Apparatus in accordance with claim 9 wherein the means for reducing the pressure in said molding grooves comprises a source of vacuum, said forming wheel having a hollow interior communicating with said source, and radial passages in the forming wheel connecting each of said molding grooves with the hollow interior thereof.

13. Apparatus in accordance with claim 12 further comprising means limiting communication of said molding grooves with said source of vacuum to a portion only of the path traversed by said forming wheel during each revolution.

14. Apparatus in accordance with claim 13 wherein said means limiting communication of the molding grooves with the source of vacuum comprises a sealing assembly including a flexible seal plate fixed within said forming wheel and extending partly around the path traversed by said forming wheel during each revolution, and a pneumatic bladder urging said flexible plate into contact with the inner periphery of said forming wheel as it rotates for covering the radial passages therein whereby communication of said grooves with said source is prevented.

15. Apparatus in accordance with claim 14 wherein said seal plate has relatively narrow flat shoulders extending longitudinally thereon at the margins thereof for engaging the inner periphery of said forming wheel.

16. Apparatus in accordance with claim 15 wherein said flat shoulders are coated with an anti-friction coating of glass impregnated Teflon.

17. Apparatus in accordance with claim 9 wherein said forming wheel is a built up assembly including an annular ring, and side plates connected with said annular ring, the molding grooves being formed in the outer periphery of said annular ring, said annular ring having transverse slots therein extending inwardly a distance from said outer periphery, baffle plates removably supported in said slot and extending within said molding grooves for shaping said smoke barriers and supporting ribs in said sections, said annular ring having radially directed passages connecting said transverse slots with the interior of said forming wheel.

18. Apparatus in accordance with claim 9 further comprising a pair of endless bands, and means for advancing said endless bands around the periphery of said forming wheel at the sides thereof and in contact with the margins of said strip thereby to hold said strip against the periphery of said forming wheel during shaping.

19. Apparatus in accordance with claim 9 said apparatus further including a heater device for conditioning said strip prior to advancing it onto the forming wheel.

20. Apparatus in accordance with claim 9 further comprising a heater assembly supported adjacent said forming wheel and extending partly therearound for heating said strip to a near plastic state preparatory to drawing said strip against said molding surfaces.

21. Apparatus in accordance with claim 9 further comprising a device supported adjacent said forming wheel for directing a stream of cooling fluid onto said strip as it is removed from said forming wheel thereby to prevent stretching of said strips.

22. Apparatus in accordance with claim 9 wherein the means for longitudinally severing the respective sections in the strip as it comes off the forming wheel comprises a rotating knife assembly supported adjacent said forming wheel.

23. Apparatus in accordance with claim 22 further comprising a guide loop assembly supported adjacent said rotating knife assembly, said guide loop assembly including separate circular track members each receiving one of said sections and directing it through a path divergent from that of the other whereby hoop-forming tendencies imparted to the sections on said forming wheel are relieved therefrom.

24. Apparatus in accordance with claim 23 further comprising means for establishing an air blanket in each of said track members on which said sections may travel.

25. Apparatus in accordance with claim 9 further comprising a device for applying adhesive to one of said parti-tubular sections, said device comprising a reservoir for holding adhesive, a pair of rollers through which said one section is advanced, one of said rollers having a peripheral groove corresponding to the outside shape of the section, the other having a pair of grooves receiving the longitudinal edges of said section, said other roller rotating through said reservoir whereby adhesive is picked up in said pair of grooves and deposited on said longitudinal edges.

26. Apparatus in accordance with claim 9 wherein the means assembling the respective sections into a continuous tubular article comprises a separate mechanism engageable with each section and each operable in concurrent relation with the other to control the longitudinal positioning of one section with respect to the other, each mechanism being adapted to urge its associated section into interfitting contact with the other section.

27. Apparatus in accordance with claim 25 further comprising a heater for melting the adhesive on the longitudinal edges of said one parti-tubular section after it has been assembled with the other parti-tubular section for effecting an adhesive connection between said sections.

28. Apparatus in accordance with claim 27 further comprising a device for directing a stream of cooling fluid over the adhesive connection between said sections to solidify the adhesive.

29. Apparatus in accordance with claim 9 further comprising means for feeding a strip of embossed filter material longitudinally intermediate said sections as they are being assembled.

30. Apparatus in accordance with claim 29 wherein said means feeding the strip of embossed filter material intermediate said sections comprises a pair of printing rollers through which the strip is advanced and which deposit an impregnant on said strip at spaced locations, and a pair of embossing rollers having embossing lands thereon which register on said strip at said spaced locations as the said embossing rollers rotate.

31. A forming member for shaping a continuous strip of moldable material which comprises a wheel having a hollow interior and a molding surface extending around the outer periphery thereof onto which said strip may be advanced, said wheel having a hollow hub member by means of which the interior thereof can be placed in communication with a source of vacuum, the molding surface having a shape adapted to produce the shape to be formed in said strip, said molding surface being in communication with the hollow interior of said wheel whereby the source of vacuum may draw said strip against said molding surface, and a sealing assembly supported in a fixed position within said wheel and extending around a portion of the inner periphery of said wheel and engageable therewith to bar communication of said molding surface with said source of vacuum except at a portion only of the path the wheel traverses when rotated.

References Cited

UNITED STATES PATENTS

| | | | |
|---|---|---|---|
| 1,619,387 | 3/1927 | Waugh | 131—264 |
| 1,980,563 | 11/1934 | Walker. | |
| 2,570,921 | 10/1951 | Collins | 156—466 XR |
| 2,616,232 | 11/1952 | Meyer | 156—292 XR |
| 2,912,043 | 11/1959 | Borg Holtz et al. | 156—292 XR |
| 3,323,274 | 6/1967 | Justus | 156—292 XR |
| 3,394,713 | 7/1968 | Thomson et al. | 131—210 XR |
| 3,400,007 | 9/1968 | Rudszinat | 156—466 XR |

EARL M. BERGERT, Primary Examiner

C. W. MOXON II, Assistant Examiner

U.S. Cl. X.R.

29—200, 463; 156—259, 292, 500

PO-1050
(5/69)

UNITED STATES PATENT OFFICE
CERTIFICATE OF CORRECTION

Patent No. 3,466,213          Dated September 9, 1969

Inventor(s) Wesley S. Larson, Richard L. Panicci, Richard N. Thomson and Jerome S. Osmalov.

It is certified that error appears in the above-identified patent and that said Letters Patent are hereby corrected as shown below:

Column 2, line 15, "section" should read --sections--. Column 3, line 46, "exists" should read --exits--. Column 4 line 27, "assembly" should read --assembler--. Column 4, li 66, "rovided" should read --provided--. Column 7, line 31, "hoid" should read --hold--. Column 7, line 71, after "Thus insert --to preclude pre-formation or precipitous shaping du to--. Column 7, delete line 72. Column 9, line 44, after "feed" insert --shown--. Column 9, line 52, after "convex" insert --outer--. Column 11, line 46 "pasing" should read --passing--. Column 13, line 20, "length" should read --len{

SIGNED AND
SEALED
MAY 12 1970

(SEAL)
Attest:

Edward M. Fletcher, Jr.
Attesting Officer

WILLIAM E. SCHUYLER, JR.
Commissioner of Patents